US009535718B2

(12) United States Patent
Dewar et al.

(10) Patent No.: US 9,535,718 B2
(45) Date of Patent: Jan. 3, 2017

(54) APPARATUS, SYSTEM, AND METHOD FOR COLLECTING METRICS FROM A NON-MONOLITHIC WEBSITE

(75) Inventors: Ami H. Dewar, Durham, NC (US); Robert C. Leah, Cary, NC (US); Nicholas E. Poore, Durham, NC (US); Peter C. Yim, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1762 days.

(21) Appl. No.: 12/104,015

(22) Filed: Apr. 16, 2008

(65) Prior Publication Data

US 2009/0265196 A1 Oct. 22, 2009

(51) Int. Cl.
*G06Q 30/00* (2012.01)
*G06F 9/44* (2006.01)
*G06Q 10/06* (2012.01)

(52) U.S. Cl.
CPC ............ *G06F 9/4443* (2013.01); *G06Q 10/063* (2013.01)

(58) Field of Classification Search
CPC .................................. G06F 3/00; G06F 17/60
USPC ......... 715/863; 345/159, 811; 705/14, 16, 34
See application file for complete search history.

(56) References Cited

U.S. PATENT DOCUMENTS

| 6,907,581 B2 * | 6/2005 | Noy ...................... G06F 3/0481 715/856 |
| 2004/0078292 A1 * | 4/2004 | Blumenau ............... G06F 11/34 705/14.54 |
| 2004/0087373 A1 * | 5/2004 | Choi .............................. 463/42 |
| 2009/0138810 A1 * | 5/2009 | Howard et al. ............... 715/760 |
| 2009/0138924 A1 * | 5/2009 | Eastes .................... G06Q 30/02 725/109 |

* cited by examiner

*Primary Examiner* — Rokib Masud
(74) *Attorney, Agent, or Firm* — Jeffrey T. Holman

(57) ABSTRACT

An apparatus, system, and method are disclosed to collect metrics from a non-monolithic website having external content. The method includes monitoring a pointer movement in a web page. The web page displays a content feed of the external content. The method also includes identifying a pointer movement representative of an interaction gesture. The interaction gesture is indicative of a type of interaction with the content feed of the external content. The method also includes generating a score for the content feed in response to the pointer movement including an interaction gesture. The score includes a quantity of each of the reported types of interaction with the content feed.

12 Claims, 8 Drawing Sheets

APPARATUS, SYSTEM, AND METHOD FOR COLLECTING METRICS FROM A NON-MONOLITHIC WEBSITE

BACKGROUND

Users of the internet no longer want to browse through endless sites to find their solutions. They would prefer that the information they are looking for be brought to them. Many websites now offer syndication technologies such as Really Simple Syndication (RSS) and Atom and disseminate feeds related to their site content.

Users can read these feeds now through readers, browsers, on cell phones, and in syndication feed mashups offered as personalized pages for users. These personalized pages (offered by Google™, Yahoo™, Microsoft™, IBM™ developer spaces, Netvibes™, etc) can aggregate a user's feeds and present them as a custom newspaper that caters to the reader's particular interests. Users no longer have to visit different websites to peruse their favorite sites every day. Instead the content they look for most often can be made available on one non-monolithic web page that collects content from sites all over the web. This non-monolithic web page displays content from external sources, such as syndication feeds, on a unified web page.

However, traditional site metrics are calculated based on page views and click-throughs. Personalized pages and mashups present content from external sources which may be viewed by the user, but unless the user "clicks through" to the original content, traditional methods of determining the audience for content do not accurately reflect the value of a particular piece of content. For example, if a site has 300,000 tracked users and twice as many tracked views, but there are 450,000 actual readers and a high volume of user interaction not tracked by views, it can be a detriment to a site's business. In this case, the site is not getting credit for the traffic being generated by the content on the site.

SUMMARY

Embodiments of a computer program product are described. In one embodiment, the computer program product includes a computer useable medium to store a computer readable program, that, when executed on a computer, causes the computer to execute operations to collect metrics from a non-monolithic website having external content. The operations executed by the computer program product include an operation to monitor a pointer movement in a web page. The web page displays one or more content feeds. The operations also include an operation to report the pointer movement in response to the pointer movement including an interaction gesture. An interaction gesture, in one embodiment, is a pointer movement indicating one or more types of interaction with one or more content feeds displayed by the web page. In certain embodiments, the computer program product includes an operation to tabulate a quantity of one or more types of interaction with one or more content feeds displayed by the web page. Other embodiments of a computer program product are also described.

Embodiments of a system are also described. In one embodiment, the system collects metrics from a non-monolithic website. The system includes a web server such as a computer configured to host web content. In certain embodiments, the system also includes an interactive web application hosted by the web server. The interactive web application displays web content on a display and exchanges data with the web server. In one embodiment, the system includes a monitoring application with a pointer movement monitor that monitors a pointer movement in a web page. The web page displays one or more content feeds. The monitoring application may further include an interaction reporter that reports the pointer movement in response to the pointer movement including an interaction gesture. The interaction gesture indicates one or more types of interaction with one or more content feeds displayed by the web page. In one embodiment, the monitoring application includes a score generator that generates a weighted score for a content feed. The weighted score indicates a level of interaction with the content feed. Other embodiments of the system are also described.

Embodiments of an apparatus are also described. In one embodiment, the apparatus collects metrics from a non-monolithic website having external content. One embodiment of the apparatus includes a pointer movement monitor that monitors a pointer movement in a web page. The web page displays one or more content feeds. The apparatus may also include an interaction reporter that reports the pointer movement in response to the pointer movement including an interaction gesture. The interaction gesture indicates one or more types of interaction with one or more content feeds displayed by the web page. In certain embodiments, the apparatus includes a score generator that generates a weighted score for a content feed. The weighted score indicates a level of interaction with the content feed. Other embodiments of the apparatus are also described.

Embodiments of a method are also described. In one embodiment, the method collects metrics from a non-monolithic website having external content. The method includes monitoring a pointer movement in a web page. The web page displays one or more content feeds. In one embodiment, the method includes reporting the pointer movement to a score generator in response to the pointer movement including an interaction gesture. The interaction gesture indicates one or more types of interaction with one or more content feeds displayed by the web page. In certain embodiments, the method further includes generating a weighted score in the score generator for the content feed. The weighted score includes a quantity of each of the reported types of interaction with a content feed weighted by a weight for each of the types of interaction with the content feed. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments collect metrics for users of a non-monolithic website containing external content. In particular, embodiments of the described system, method, and apparatus collect metrics describing interactions with the external content that is not collected by traditional, page-view based metrics.

Figure 1:
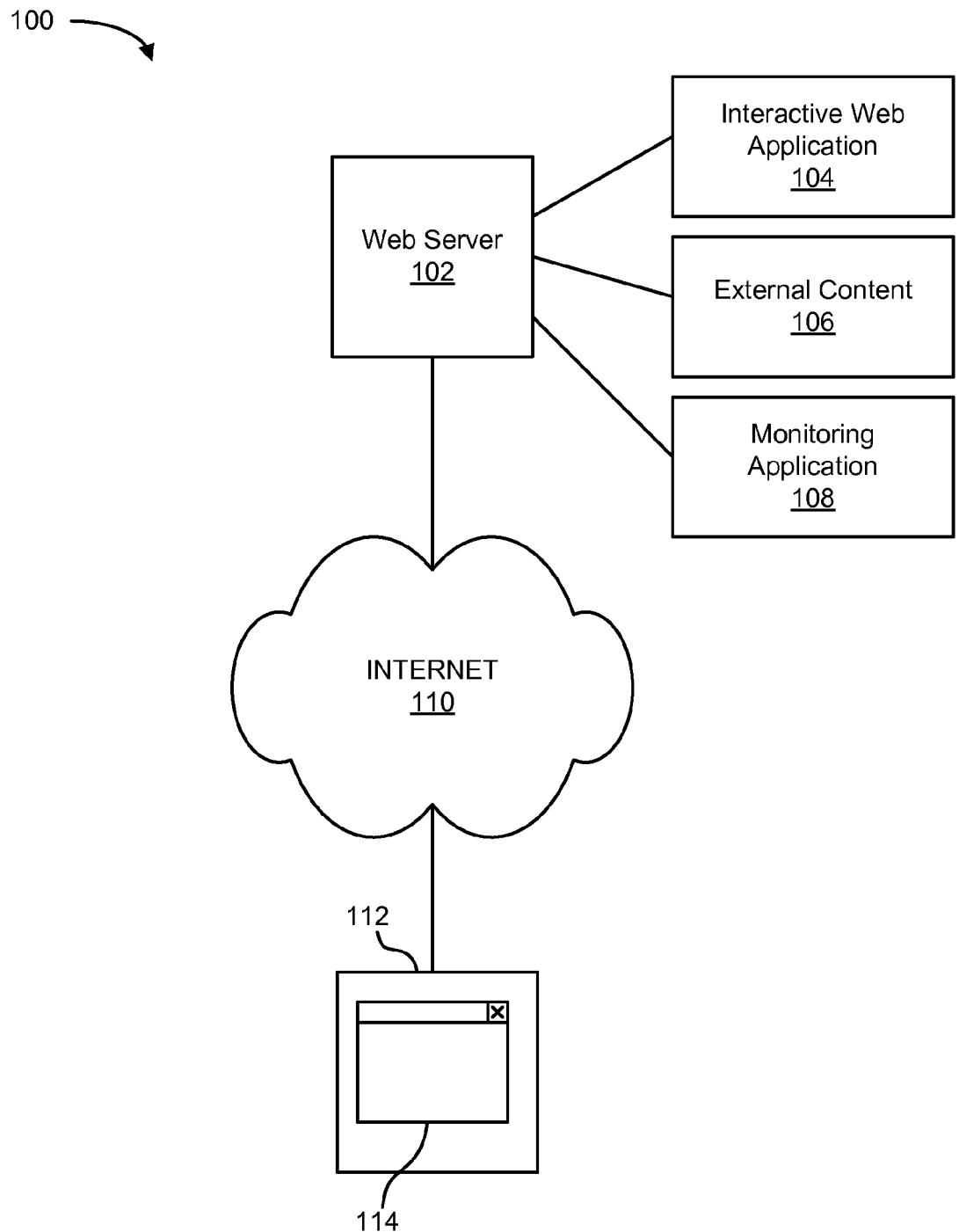
FIG. 1 depicts a schematic block diagram illustrating one embodiment of a system for collecting metrics from a non-monolithic website.

FIG. 1 is a schematic block diagram illustrating one embodiment of a system 100 for collecting metrics from a non-monolithic website. In the illustrated embodiment, the system 100 includes a web server 102, an interactive web application 104, external content 106, and a monitoring application 108. The system 100 monitors interactions with content feeds in a non-monolithic website.

The web server 102 is a computer running software that hosts web content, in one embodiment. In the illustrated embodiment, the web server 102 communicates the interactive web application 104 over the internet 110 to a display 112. The interactive web application 104 displays web content 114 on the display 112.

The interactive web application 104 may be any collection of computer readable code that displays web content 114 on a display 112 and receives input from a user in relation to the web content 114. One example of an interactive web application 104 is an asynchronous JavaScript™ and XML (AJAX) based web page. In this example, the AJAX based web page includes commands that cause the display 112 to display the web content 114 and commands that cause a computer associated with the display to track interactions with the web content 114.

In certain embodiments, the interactive web application 104 communicates with the web server 102 asynchronously. For example, in the illustrated embodiment, the interactive web application 104 may communicate data relating to interactions with the web content 114 to the web server 102 without requesting a new web page. In an alternative embodiment, the interactive web application 104 may communicate data relating to interaction with the web content 114 to a metrics server (not shown).

The web content 114, in the illustrated embodiment, includes one or more feeds of external content 106. The external content 106 may be any content provided from a source external to the web server 102. For example, the external content 106 may be a really simple syndication (RSS) feed or an Atom feed. In another example, the external content 106 may be scraped from external sources such as a website, a forum, a blog, or the like.

The external content 106, in the illustrated embodiment, is incorporated into the web content 114 displayed on the display 112 by the interactive web application. Examples of interactive web applications that display external content include those provided by my.yahoo.com and iGoogle.com.

As will be appreciated by one skilled in the art, the interactive web application 104 may display external content 106 in conjunction with other content such as internal content. The web content 114 may include any combination of internal content and external content 106 from one or multiple sources. The web content in certain embodiments includes content from a single source. The system 100, in certain embodiments, collects metrics for content regardless of the source of the content. In one embodiment, the system 100 collects metrics separately for each source of content.

The monitoring application 108, in one embodiment, monitors the interaction of a user with the web content 114. The types of interaction monitored by the monitoring application 108 include, but are not limited to, placing a pointer over a representation of a content feed, selecting text, copying text, moving items, and making items visible. Some types of interactions monitored by the monitoring application 108 are discussed in more detail below in relation to FIGS. 4-9.

In one embodiment, the monitoring application 108 is computer code that is stored on a memory device and operates on a computer connected to the display 112. The computer code may be any type of code known in the art capable of monitoring user interactions. For example, the monitoring application 108 may be a JavaScript™ application.

In the illustrated embodiment, the monitoring application 108 is delivered by the web server 102 to the computer operating the display 112. In an alternative embodiment, the monitoring application 108 is delivered from an external source, such as a monitor application web server (not shown). In yet another embodiment, the monitoring application 108 may be integrated with a web browser (not shown). For example, the monitoring application 108 may be in the form of a plug in that is installed on a web browser. In another embodiment, the monitoring application 108 is integrated with the web content 114.

The internet 110, in the illustrated embodiment, is a communication framework that communicates data among various communication nodes. For example, in the illustrated embodiment, the internet 110 communicates the interactive web application 104 to the display 112. In certain embodiments, a different communication framework known in the art may be used, such as a local area network (LAN) or the like, and should be considered to be within the scope of the invention.

The display 112 may be any device capable of displaying web content 114. For example, the display 112 may be a computer with a monitor, a web-enabled cell phone, a laptop computer, a web kiosk, or another type.

Figure 2:
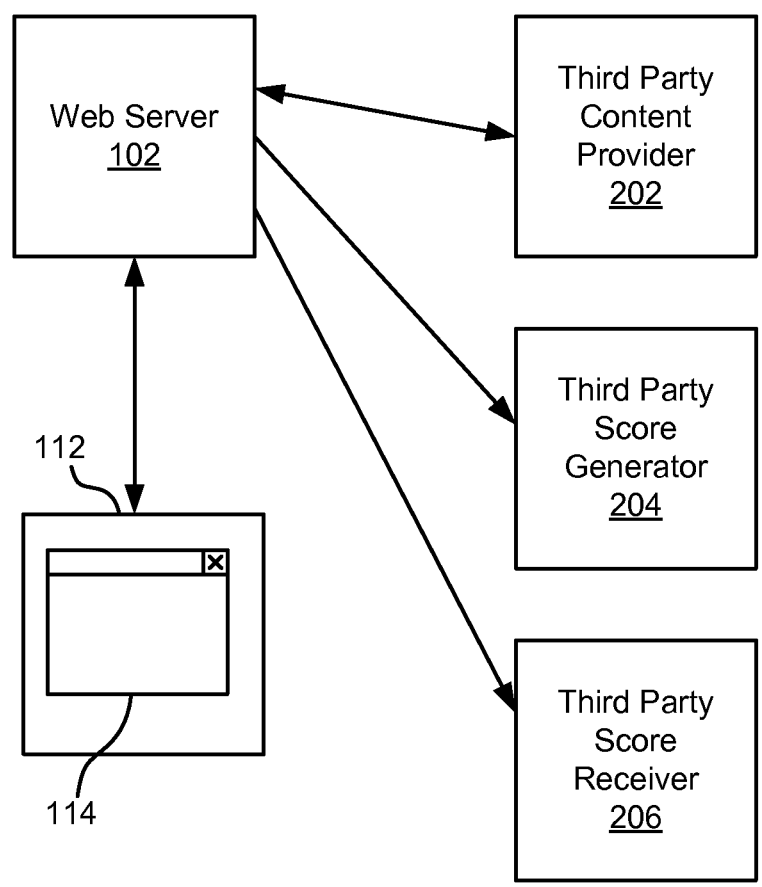
FIG. 2 depicts a schematic block diagram illustrating one embodiment of a communication framework for collecting metrics from a non-monolithic website.

FIG. 2 is a schematic block diagram illustrating one embodiment of a communication framework 200 for collecting metrics from a non-monolithic website. The communication framework 200 includes a web server 102, a display 112, web content 114, a third party content provider 202, a third party score generator 204, and a third party score receiver 206. The web server 102, the display 112, and the web content 114 are preferably configured in a like manner to same numbered components described in relation to FIG. 1. The communication framework 200 is a framework for communication of the web content 114, the interactive web application 104, the monitoring application, metrics, and constituent data used for metrics.

Communication between the elements of the communication framework 200 may take place using any communication technique known in the art. An example of an appropriate communication technique is the use of transmission control protocol/internet protocol (TCP/IP).

In the illustrated embodiment, the web server 102 is in two-way, asynchronous communication with the display 112. The web server 102 sends web content 114 to the display 114. The web content 114 may include a monitoring application 108 that causes the display 112 to report interaction with the web content 114 to the web server 102. In an alternative embodiment, the monitoring application 108 may cause the display 112 to report interactions with the web content 114 to a different component, such as a third party score generator 204.

The web content 114 provided by the web server 102 includes external content 106 provided by a third party content provider 202, in the illustrated embodiment. A plurality of third party content providers 202 may provide a plurality of content feeds for inclusion in the web content 114. The third party content provider 202 communicates content to the web server 102, in one embodiment. In an alternative embodiment, the third party content provider 202 may communicate content directly to the display 112. In yet another embodiment, the third party content provider 202 may communicate content to an intermediary (not shown) which communicates the content to the web server 102.

In the illustrated embodiment, the web server 102 communicates metric data to the third party content provider 202. The metric data may include any data collected by the web server 102 about interactions with content. For example, the web server 102 may receive a report from the monitoring application 108 about types and quantities of interactions with the web content 114, which is then communicated to the third party content provider 202.

In one embodiment, the web server 102 provides an application programming interface (API) that supports requests to deliver metric data. For example, the web server 102 may receive a request from the third party content provider 202 that conforms to the API. In response to the request, the web server 102 communicates metrics to the third party content provider 202.

In an alternative embodiment, the web server 102 may process the data and communicate the results of this processing to the third party content provider 202. For example, the web server 102 may include a score generator (not shown) which generates a weighted score for interactions with the content provided by the third party content provider 202. The score generator, in this example, may weight each type of interaction with a weight, multiply a reported quantity of each type of interaction by the respective weight, and add the weighted scores for each type of interaction to reach an overall weighted score. This weighted score may then be passed to the third party content provider 202.

In the illustrated embodiment, the web server 102 communicates metric data to a third party score generator 204. The third party score generator 204, in the illustrated embodiment, receives a report about types and quantities of interactions with the web content 114 from the web server 102. In an alternative embodiment, the third party score generator 204 receives a report about types and quantities of interaction with the web content 114 from the display 112.

The third party score generator 204, in one embodiment, generates a score for each interaction with the web content 114. The score may be a weighted score generated by weighting each type of interaction with a weight, multiplying a reported quantity of each type of interaction by the respective weight, and adding the weighted scores for each type of interaction to reach an overall weighted score.

The score generated by the third party score generator 204, in one embodiment, is communicated to a third party content provider 202. In another embodiment, the score may be communicated to the web server 102. In a further embodiment, the score may be delivered to the third party score receiver 206.

The third party score receiver 206 receives a score representing a level of interaction with the web content 114. In the illustrated embodiment, the third party score receiver 206 receives the score from the web server 102. In an alternative embodiment, the third party score receiver 206 receives the score from a third party score generator 204. In yet another embodiment, the third party score receiver 206 receives the score from the third party content provider 202.

Figure 3:
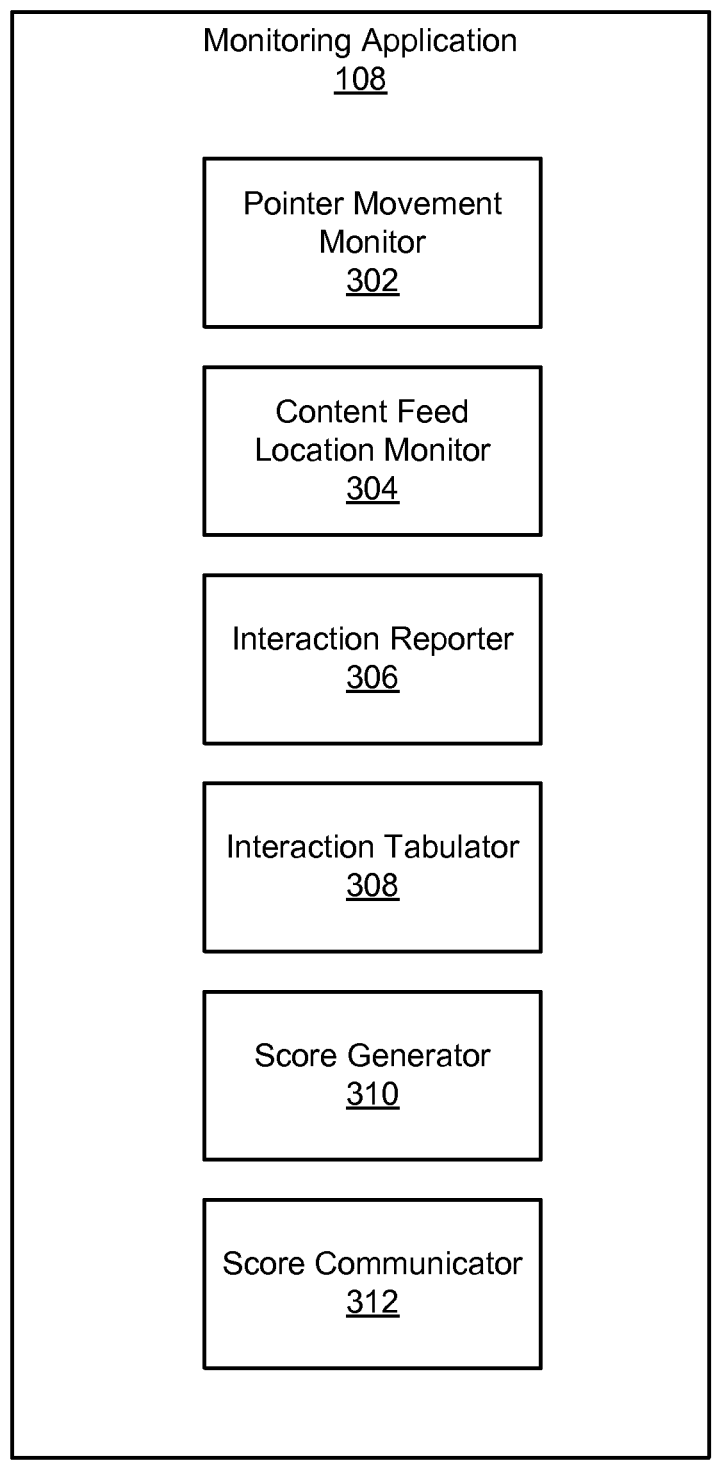
FIG. 3 depicts a schematic block diagram illustrating one embodiment of a monitoring application.

FIG. 3 is a schematic block diagram illustrating one embodiment of a monitoring application 108. The monitoring application 108, in the illustrated embodiment, includes a pointer movement monitor 302, a content feed location monitor 304, an interaction reporter 306, an interaction tabulator 308, a score generator 310, and a score communicator 312. The monitoring application 108 monitors and reports interactions with web content 114.

The pointer movement monitor 302, in one embodiment, monitors the movement of a pointer relative to the web content 114. The pointer movement monitor 302 may be computer executable code that causes the computer to monitor the movement of a pointer relative to the web content 114. For example, the pointer movement monitor 302 may be JavaScript™ code that operates within a web browser to monitor pointer movement.

The content feed location monitor 304, in one embodiment, monitors the location of a content feed in the web content 114. The content feed location monitor 304 may be computer executable code that causes the computer to monitor the location of the content feed in the web content 114. For example, the content feed location monitor 304 may be JavaScript™ code that operates within a web browser to monitor content feed location.

The interaction reporter 306 reports interactions with a content feed, in the illustrated embodiment. In one embodiment, the interaction reporter 306 reports an interaction if a pointer movement reported by the pointer movement monitor 302 is determined to be an interaction gesture.

Interaction gestures may include any pointer movement that indicates a type of interaction with elements of the non-monolithic website. For example, pointer movements that include rolling over a representation of a content feed, remaining over or "hovering" over a representation of a content feed for a pre-determined time, selecting text in a content feed, and moving a representation of a content feed may constitute interaction gestures. Some types of interaction gestures are discussed in more detail in relation to FIGS. 4-9.

In a further embodiment, the interaction reporter 306 reports an interaction if a location of a representation of a content feed reported by the content feed location monitor 304 is determined to be an interaction gesture. For example, the interaction reporter 306 may report an interaction if a representation of a content feed is within a view pane. In this example, the view pane defines the area of the web page that is visible on a display.

As another example, a content feed may include a plurality of discrete items within the content feed, such as different stories or articles within the feed. In this example, the interaction reporter 306 may report interactions with the entire feed and/or interactions with items within the feed.

The interaction reporter 306, in one embodiment, reports interactions to the interaction tabulator 308. In another embodiment, the interaction reporter 306 reports interactions to the score generator 310. In yet another embodiment, the interaction reporter 306 communicates interactions to an external receiver (not shown) such as the web server 102 or a third party score generator 204.

In the illustrated embodiment, the interaction tabulator 308 tabulates a quantity of one or more types of interaction with a content feed. The interaction tabulator 308 receives reports of interactions from the interaction reporter 306, in this embodiment, and maintains a record of the number of each type of interaction that is reported. For example, the interaction tabulator 308 may maintain a record that shows that a content feed has been hovered over three times, text in the content feed has been selected twice, and the representation of the content feed is located within the view pane.

In an alternative embodiment, the interaction tabulator 308 operates within the web server 102. In this embodiment, the interaction tabulator 308 receives a report from the interaction reporter 306 over the internet 110 and maintains a record of interactions with the web content at the web server 102. In other embodiments, the interaction tabulator 308 may be located on various other hosts such as a third party score generator 204, the third party content provider 202, or tabulation host (not shown).

The interaction tabulator 308, in another embodiment, receives reports from a plurality of interaction reporters 306. In this embodiment, the interaction tabulator 308 maintains a record of interaction with web content from a plurality of displays 112. In this embodiment, the interaction tabulator 308 may be located on the web server 102, a third party score generator 204, a third party content provider 202, a tabulation host, or another location.

The score generator 310 generates a score reflecting a level of interaction with the web content based on the reported interactions. The score, in this embodiment, is based on a mathematical relationship between the quantity and types of interaction with the web content. In one embodiment, a score is generated for an individual content feed, with each content feed having its own generated score. However, in certain embodiments, the score generator 310 generates a cumulative score for all of the items in the web content, or for a subset of items in the web content.

In one embodiment, the score generator 310 generates a weighted score by weighting each type of interaction with the web content by a weight. For example, rolling over an item representing a content feed may be assigned a weight of 0.2, while hovering over an item representing a content feed for more than one second may be assigned a weight of 0.5. The score generator 310, in this example, may generate a weighted score by multiplying the number of rolls by 0.2 and adding the result to the number of hovers multiplied by 0.5.

The score generator 310, in one embodiment, receives a report from the interaction tabulator 308 indicating the number of each type of interaction. In an alternative embodiment, the score generator 310 receives reports from the interaction reporter 306 in response to an interaction being an interaction gesture. In this embodiment, the score generator 310 updates the score in response to the receipt of a reported interaction.

In an alternative embodiment, the score generator 310 operates within the web server 102. In this embodiment, the score generator 310 receives a report from the interaction reporter 306 and/or the interaction tabulator 308 over the internet 110 and a score at the web server 102. The score generator 310 may be located on various other hosts, such as a third party score generator 204, the third party content provider 202, or the like.

The score reporter 312, in the illustrated embodiment, reports a score generated by the score generator 310. In one embodiment, the score reporter 312 reports the score to the web host 102. In another embodiment, the score reporter 312 reports the score to the third party content provider 202. In yet another embodiment, the score reporter 312 reports the score to a third party score receiver 206. The score reporter 312 may be located on various other hosts, such as the web server 102, the third party content provider 202, the third party score generator 204, or the like.

Figure 4:
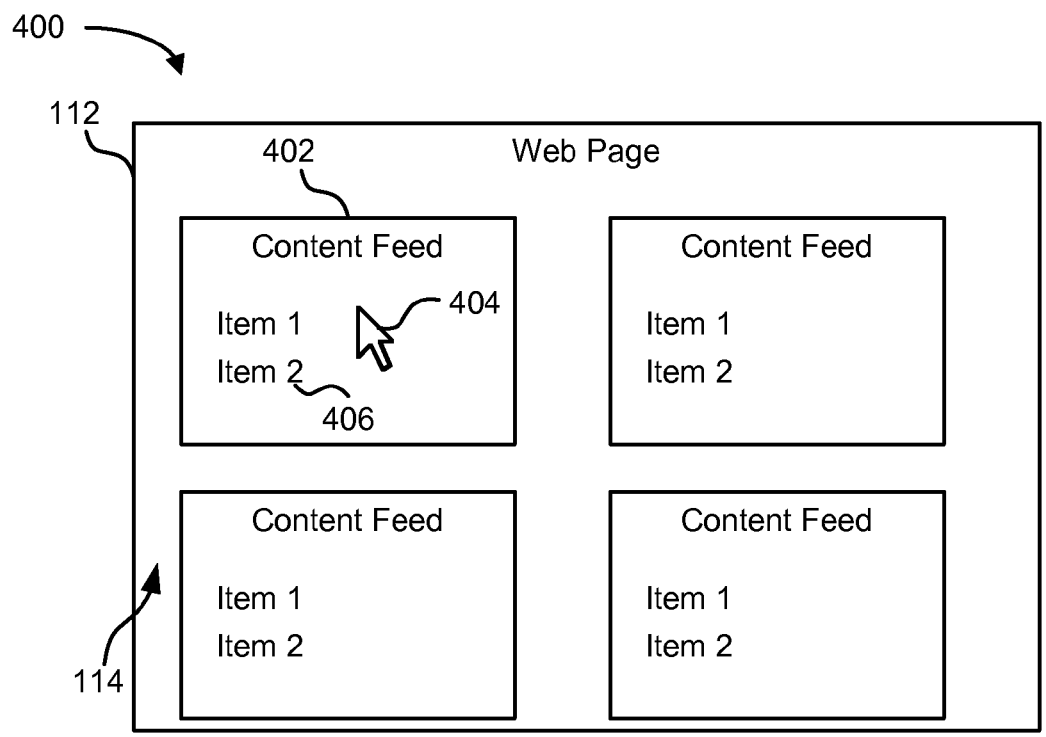
FIG. 4 depicts one embodiment of a roll over interaction gesture.

FIG. 4 illustrates one embodiment of a roll over interaction gesture 400. In the illustrated embodiment, a display 112 displays web content 114 including one or more representations of content feeds 402. The pointer movement monitor 302, in certain embodiments, monitors the movement of a pointer 404 relative to the web content 114 as described above in relation to FIG. 3. In response to the pointer 404 rolling over a representation of a content feed 402, the interaction reporter 306 reports the interaction in one embodiment.

In an alternative embodiment, the interaction reporter 306 reports an interaction in response to the pointer 404 hovering over the representation of a content feed 402 for a pre-determined time. For example, the pre-determined time may be two seconds, and in response to the pointer remaining over the representation of a content feed for two seconds, the interaction reporter 306 reports the interaction.

As described above, in certain embodiments, interaction reports are also generated for interactions with items 406 within a content feed 402. For example, the interaction reporter 306 may determine that a pointer movement is an interaction gesture in response to the pointer hovering over an item 406 for more than two seconds.

Figure 5:
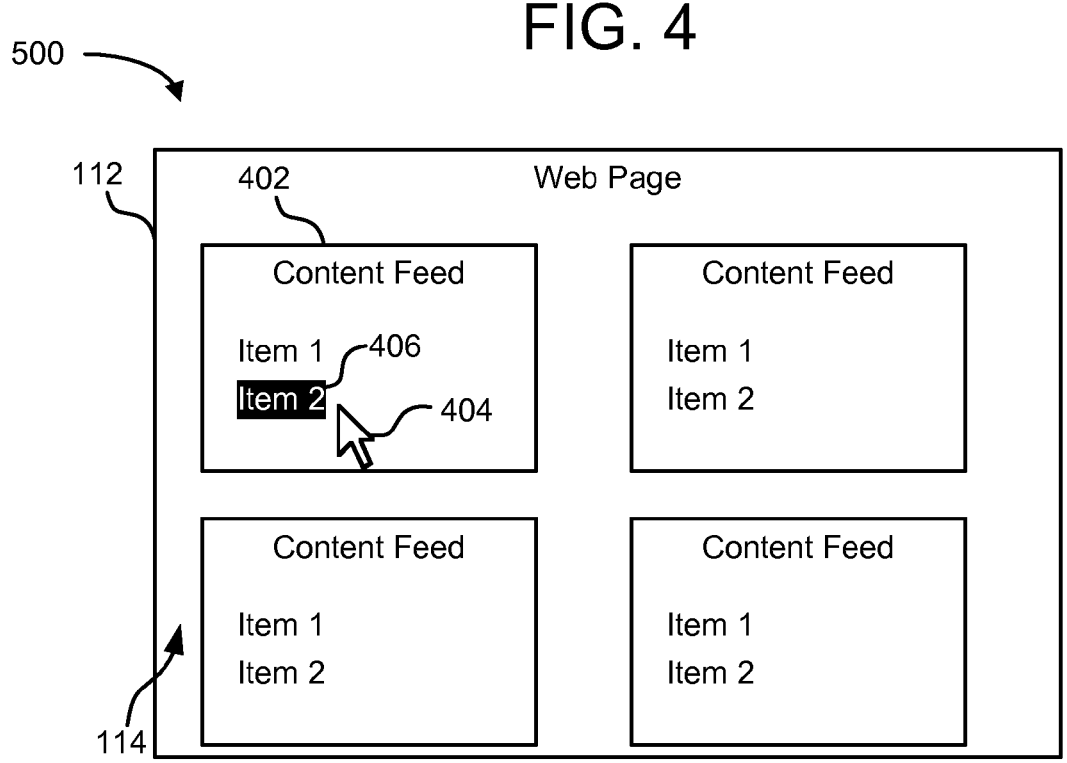
FIG. 5 depicts one embodiment of a text select interaction gesture.

FIG. 5 illustrates one embodiment of a text select interaction gesture 500. In the illustrated embodiment, a display 112 displays web content 114 including one or more representations of content feeds 402. The pointer movement monitor 302, in certain embodiments, monitors the movement of a pointer 404 relative to the web content 114 as described above in relation to FIG. 3. In response to the pointer 404 selecting text in a representation of a content feed 402, the interaction reporter 306 reports the interaction in this embodiment.

In an alternative embodiment, the interaction reporter 306 reports an interaction in response to the pointer 404 copying text within the representation of a content feed 402. For example, in response to the pointer 404 dragging text from the representation of a content feed 402, the interaction reporter 306 reports the interaction.

As described above, in certain embodiments, interaction reports are also generated for interactions with items 406 within a content feed 402. For example, the interaction reporter 306 may determine that a pointer movement is an interaction gesture in response to the pointer selecting text within an item 406.

Figure 6:
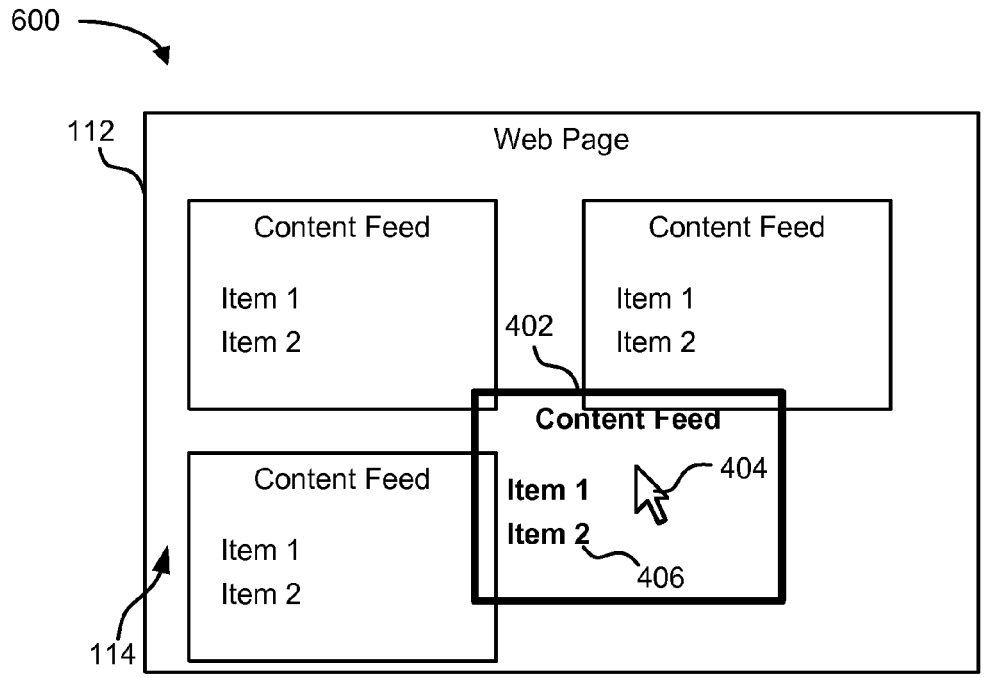
FIG. 6 depicts one embodiment of a feed movement interaction gesture.

FIG. 6 illustrates one embodiment of a feed movement interaction gesture 600. In the illustrated embodiment, a display 112 displays web content 114 including one or more representations of content feeds 402. The pointer movement monitor 302, in certain embodiments, monitors the movement of a pointer 404 relative to the web content 114 as described above in relation to FIG. 3. In response to the pointer 404 moving a representation of a content feed 402, the interaction reporter 306 reports the interaction in this embodiment. For example, the pointer 404 may grab the representation of a content feed 402 and drag it to another location within the web content 114.

In an alternative embodiment, the content feed location monitor 304 monitors the location of one or more representations of one or more content feeds 402. In this embodiment, the feed location monitor 304 reports a movement of one or more representations of content feeds 402 in response to the pointer 404 moving a representation of a content feed 402.

As described above, in certain embodiments, interaction reports are also generated for interactions with items 406 within a content feed 402. For example, the interaction reporter 306 may determine that a pointer movement is an interaction gesture in response to the pointer moving an item 406 within the representation of a content feed 402.

Figure 7:
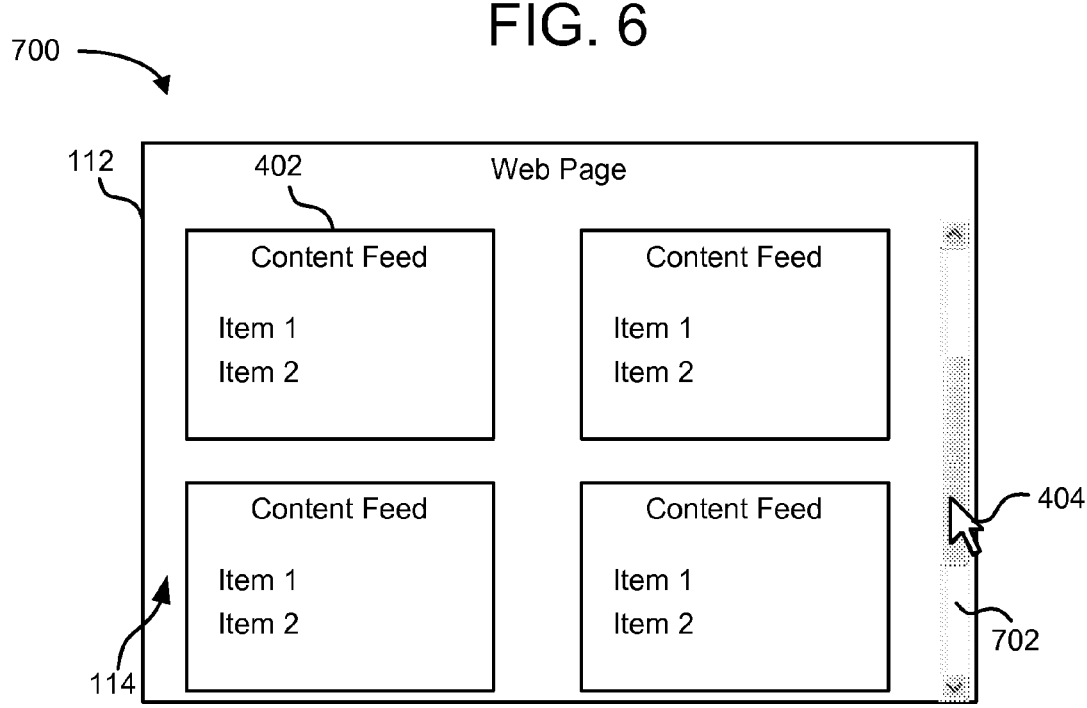
FIG. 7 depicts another embodiment of a feed movement interaction gesture.

FIG. 7 illustrates another embodiment of a feed movement interaction gesture 700. In the illustrated embodiment, a display 112 displays web content 114 including one or more representations of content feeds 402. The pointer movement monitor 302, in certain embodiments, monitors the movement of a pointer 404 relative to the web content 114 as described above in relation to FIG. 3. In response to the pointer 404 scrolling the web content 114 using a scroll bar 702, the interaction reporter 306 reports the interaction in this embodiment. For example, the pointer 404 may grab the scroll bar 702 and drag it to move the web content 114 on the display 112.

In an alternative embodiment, the content feed location monitor 304 monitors the location of one or more representations of one or more content feeds 402. In this embodiment, the feed location monitor 304 reports a movement of one or more representations of content feeds 402 in response to the pointer 402 scrolling the web content 114 using the scroll bar 702.

As described above, in certain embodiments, interaction reports are also generated for interactions with items 406 within a content feed 402. For example, a representation of a content feed 402 may include one or more scrollable items 406 within the representation of a content feed 402, and the interaction reporter 306 may report an interaction gesture in response to the pointer 402 scrolling the scrollable items 406 within the representation of a content feed 402.

Figure 8:
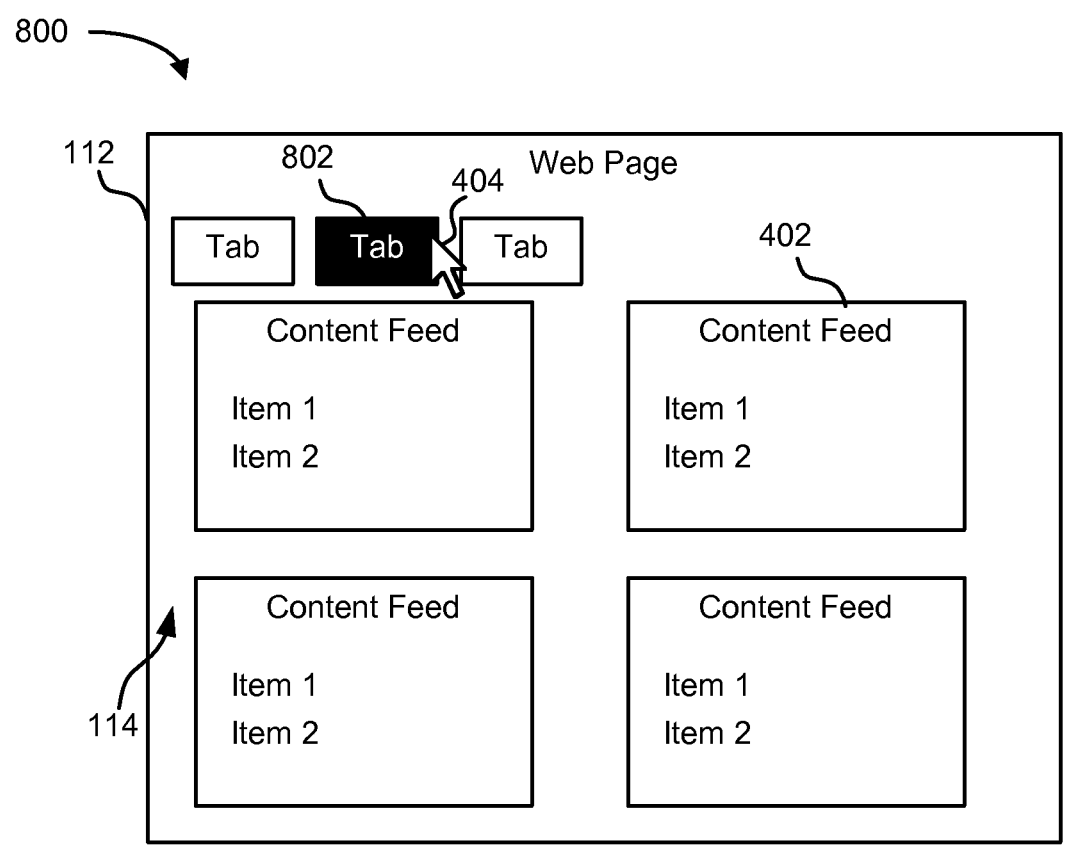
FIG. 8 depicts one embodiment of a feed visibility interaction gesture.

FIG. 8 illustrates one embodiment of a feed visibility interaction gesture 800. In the illustrated embodiment, a display 112 displays web content 114 including one or more representations of content feeds 402 organized under one or more tabs 802. The pointer movement monitor 302, in certain embodiments, monitors the movement of a pointer 404 relative to the web content 114 as described above in relation to FIG. 3. In response to the pointer 404 selecting a tab 802 that includes a representation of a content feed 402, the interaction reporter 306 reports the interaction in this embodiment.

In an alternative embodiment, the content feed location monitor 304 monitors the location of one or more representations of one or more content feeds 402. In this embodiment, the feed location monitor 304 reports visibility of one or more representations of content feeds 402 in response to the pointer selecting a tab 802 that includes a representation of a content feed 402.

Figure 9:
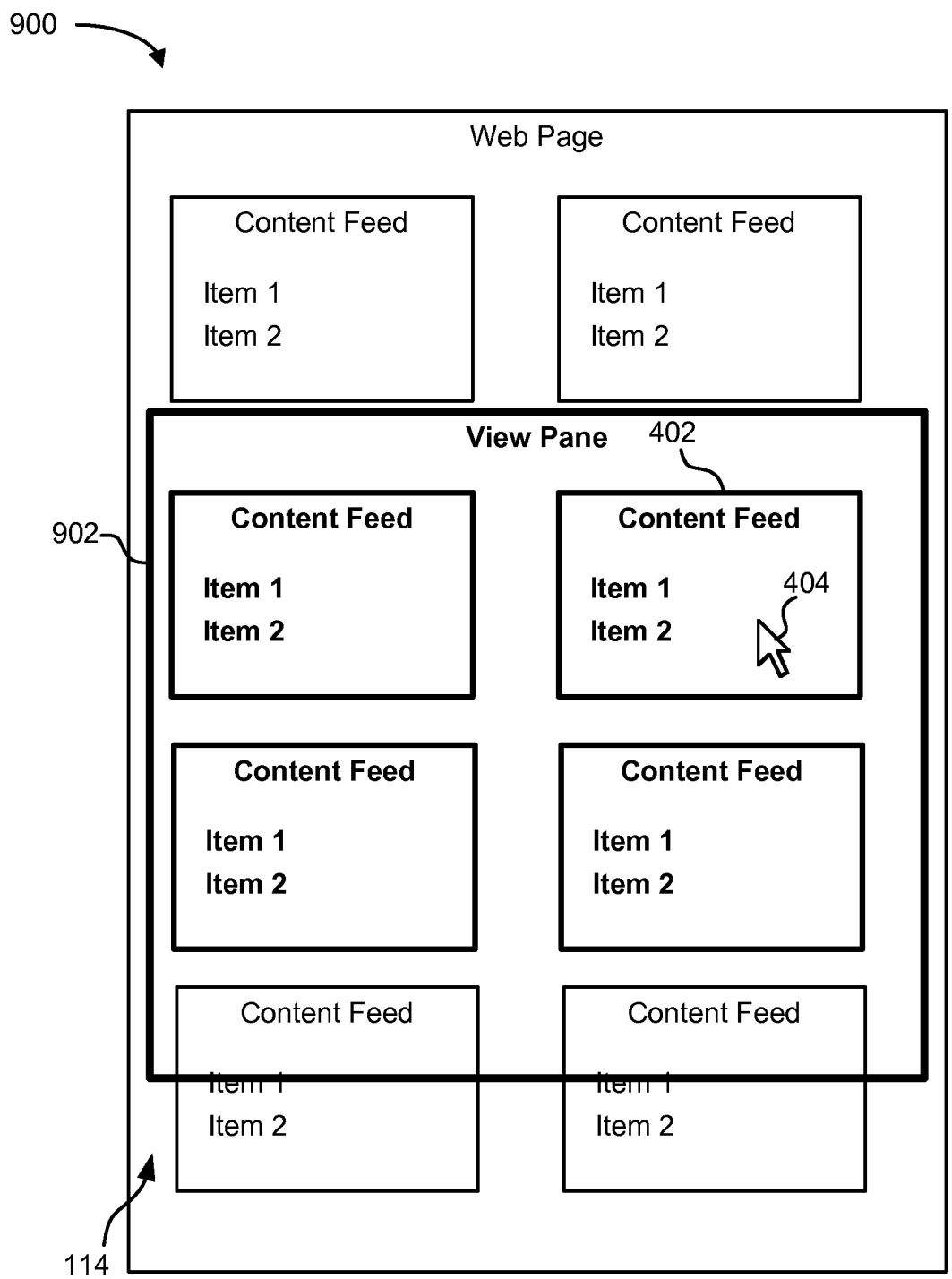
FIG. 9 depicts another embodiment of a feed visibility interaction gesture.

FIG. 9 illustrates another embodiment of a feed visibility interaction gesture 900. In the illustrated embodiment, a view pane 902 defines the area of web content 114 displayed on a display 112, including one or more representations of content feeds 402. The content feed location monitor 304 monitors the location of one or more representations of one or more content feeds 402 relative to the view pane 902. In this embodiment, the feed location monitor 304 reports visibility of one or more representations of content feeds 402 in response to the one or more representations of content feeds 402 being located within the view pane 902.

Figure 10:
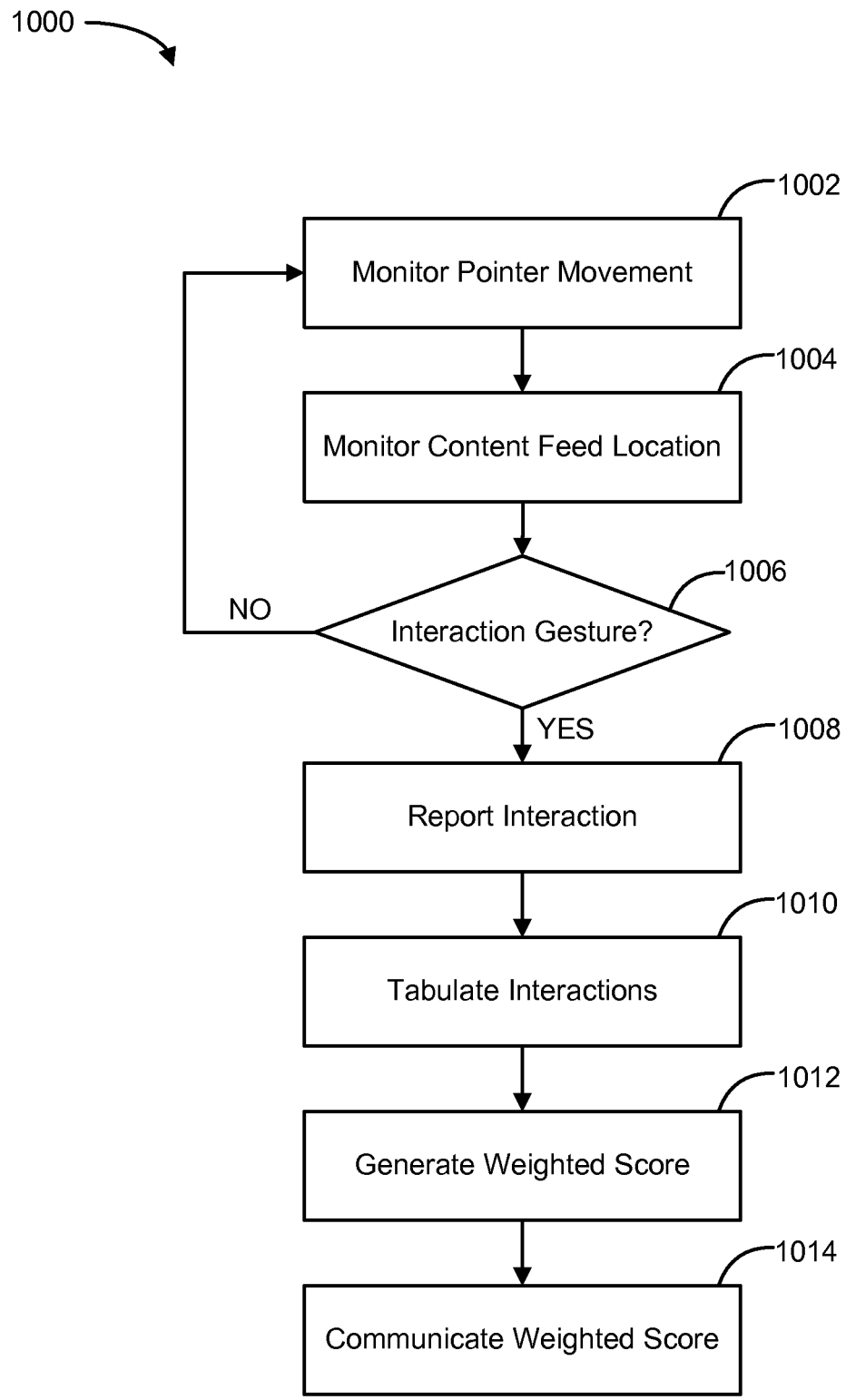
FIG. 10 depicts a flow chart diagram showing a method for collecting metrics from a non-monolithic website.

FIG. 10 is a flow chart diagram showing a method 1000 for collecting metrics from a non-monolithic website. The method 1000 is, in certain embodiments, a method of use of the system and apparatus of FIGS. 1-9, and will be discussed with reference to those figures. Nevertheless, the method 1000 may also be conducted independently thereof and is not intended to be limited specifically to the specific embodiments discussed above with respect to those figures.

As shown in FIG. 10, the pointer movement monitor 302 monitors 1002 a pointer movement relative to the web content 114. In certain embodiments, the content feed location monitor 304 monitors 1004 the location of a representation of one or more content feeds 402.

The interaction reporter 306 determines 1006 whether a mouse movement and/or a content feed location represents an interaction gesture. As described above, interaction gestures may include, but are not limited to, rolling over items, hovering over items for a pre-determined time, selecting text, copying text, moving content feeds, moving items within content feeds, and scrolling, selecting tabs, or otherwise changing a view pane to make representations of content feeds visible in a view pane.

If the interaction reporter does not determine that a mouse movement and/or a content feed location represents an interaction gesture, then the pointer movement monitor 302 continues to monitor 1002 pointer movement. In response to a determination 1006 that an interaction represents an interaction gesture, the interaction reporter 306 reports 1008 the interaction. The interaction may be reported 1008 to a web host 102, an interaction tabulator 308, a score generator 310, or another receiver of interaction reports.

The interaction tabulator 308 tabulates 1010 reported interactions. The interaction tabulator 308 may tabulate 1010 interactions by type of interaction, content feed 402, items 406 within a content feed 402, or other characteristics of the interaction. In certain embodiments, the tabulated interactions are reported to a score generator 310, a web host 102, or another receiver of interaction reports.

The score generator 310 generates 1012 a weighted score based on the reported interactions. The weighted score may be generated 1012 using a weight for each category of interaction. For example, Table 1 shows exemplary weights for a variety of interaction gestures, although other embodiments may implement other weighting systems.

TABLE 1

| Interaction Gesture | Weight |
| --- | --- |
| Roll Over | 0.2 |
| Hover | 0.5 |
| Select Text | 1 |
| Copy Text | 1.2 |
| Move Content Feed | 0.8 |
| Move Item Within Content Feed | 1 |
| Scroll to Visible | 0.5 |
| Tab to Visible | 0.2 |

In one embodiment, the weighted score is generated 1012 by multiplying the weight for each category of interaction by the respective quantity for that type of interaction to create a weighted score for each type of interaction. The weighted scores for each type of interaction are then added together to generate a cumulative weighted score.

In one embodiment, the score generator 310 generates 1012 the weighted score periodically in response to a report from an interaction tabulator 308. In an alternative embodiment, the score generator 310 generates 1012 the weighted score by continuously updating the weighted score as interactions are reported.

The score communicator 312 communicates 1014 the weighted score. In certain embodiments, the weighted score is communicated 1014 to a third party content provider 202. In another embodiment, the weighted score is communicated 1014 to a third party score receiver 206.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product to collect metrics from a non-monolithic website having external content, the computer program product comprising a computer useable storage medium to store a computer readable program, wherein the computer readable program, when executed on a computer, causes the computer to perform operations comprising:
    monitor movements of a pointer in relation to the non-monolithic website, the non-monolithic website comprising a plurality of external content, separate content of the plurality of external content sourced from different internet sources;
    identify pointer movements representative of a plurality of interaction gestures of the different internet sources of external content, the interaction gestures indicative of a type of interaction with at least one of the plurality of external content, wherein the pointer movements comprises a movement other than a click-through for the external content;
    for the plurality of external content, maintain a quantity of a first type of interaction gesture of the plurality of interaction gestures associated with corresponding one of the plurality of external content, and maintain a quantity of a second type of interaction gesture of the plurality of interaction gestures associated with the corresponding one of the plurality of external content;
    generate a separate weighted cumulative score for the different internet sources of the plurality of external content by multiplying the quantity of the first type of interaction gesture by a first respective weight to generate a first weighted score, multiplying the quantity of the second type of interaction gesture by a second respective weight to generate a second weighted score, and adding the first weighted score to the second weighted score; and
    report the separate weighted cumulative score for the different internet sources of the plurality of external content to a corresponding internet source in response to a request from the corresponding internet source.

2. The computer program product of claim 1, wherein the computer readable program, when executed on the computer, causes the computer to perform further operations comprising:

generate an interaction gesture type score for the plurality of interaction gestures associated with the corresponding plurality of external content; and communicate the quantity, for the plurality of external content, to an external computer.

3. The computer program product of claim 1, wherein the computer readable program, when executed on the computer, causes the computer to perform an operation to generate a weighted score for the plurality of interaction gestures comprising hovering over an external content for a period of time, selecting text of the external content, and copying text of the external content, the weighted score indicative of a level of interaction with the plurality of external content, wherein each weighted score comprises a quantity of one type of interaction gesture associated with one of the plurality of external content.

4. The computer program product of claim 3, wherein the computer readable program, when executed on the computer, causes the computer to perform an operation to generate a weighted score for the different internet sources, wherein the weighted score comprises a sum of the quantities of a type of interaction with the external content weighted by a weight for the type of interaction with the external content.

5. The computer program product of claim 1, wherein the external content comprises content syndicated from a third party.

6. A computer implemented method to collect metrics from a non-monolithic website having external content, the method comprising:

monitoring, via a monitoring application of a processor coupled to memory, movements of a pointer in relation to the non-monolithic website, the non-monolithic website comprising a plurality of external content, separate content of the plurality of external content sourced from different internet sources;

identifying pointer movements representative of a plurality of interaction gestures of the different internet sources of external content, the interaction gestures indicative of a type of interaction with at least one of the plurality of external content, wherein the pointer movements comprises a movement other than a click-through for the external content;

for the plurality of external content, maintaining, via a processor, a quantity of a first type of interaction gesture of the plurality of interaction gestures associated with corresponding one of the plurality of external content, and maintaining a quantity of a second type of interaction gesture of the plurality of interaction gestures associated with the corresponding one of the plurality of external content;

generating a separate weighted cumulative score for the different internet sources of the plurality of external content by multiplying the quantity of the first type of interaction gesture by a first respective weight to generate a first weighted score, multiplying the quantity of the second type of interaction gesture by a second respective weight to generate a second weighted score, and adding the first weighted score to the second weighted score; and reporting the separate weighted cumulative score for the different internet sources of the plurality of external a corresponding internet source in response to a request from the corresponding internet source.

7. The method of claim 6, further comprising reporting the interaction gesture in response to the pointer rolling over a representation of the external content.

8. The method of claim 6, further comprising reporting the interaction gestures in response to the pointer remaining over a representation of the external content for a predetermined time.

9. The method of claim 6, further comprising reporting the interaction gestures in response to the pointer highlighting at least a portion of a representation of the external content.

10. The method of claim 6, further comprising reporting the interaction gestures in response to the pointer copying text in a representation of the external content.

11. The method of claim 6, further comprising reporting the interaction gestures in response to the pointer moving a representation of the external content, wherein moving the representation of the external content comprises moving the representation of the external content within a visible portion of a display.

12. The method of claim 11, wherein moving the representation of the external content comprises at least one action selected from the group consisting of scrolling, selecting a tab, and dragging the representation of the external content.

* * * * *